(12) United States Patent
Diab et al.

(10) Patent No.: US 8,417,978 B2
(45) Date of Patent: *Apr. 9, 2013

(54) SYSTEM AND METHOD FOR REDUCING POWER CONSUMPTION DURING PERIODS OF LOW LINK UTILIZATION

(75) Inventors: Wael William Diab, San Francisco, CA (US); Howard Baumer, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,487

(22) Filed: Apr. 19, 2012

(65) Prior Publication Data

US 2012/0204045 A1    Aug. 9, 2012

Related U.S. Application Data

(63) Continuation of application No. 12/165,584, filed on Jun. 30, 2008, now Pat. No. 8,185,761.

(60) Provisional application No. 61/022,439, filed on Jan. 21, 2008.

(51) Int. Cl.
G06F 1/08        (2006.01)
G06F 1/32        (2006.01)
H04L 12/43       (2006.01)

(52) U.S. Cl.
USPC ........... 713/322; 713/300; 713/320; 370/396; 370/460

(58) Field of Classification Search ............... 713/300, 713/320, 322; 370/396, 460
See application file for complete search history.

(56) References Cited

U.S. PATENT DOCUMENTS

| | | | |
|---|---|---|---|
| 6,388,997 | B1 | 5/2002 | Scott |
| 6,628,725 | B1 | 9/2003 | Adam et al. |
| 7,327,574 | B2 | 2/2008 | Frank et al. |
| 7,382,805 | B1 | 6/2008 | Raza et al. |
| 7,461,195 | B1 | 12/2008 | Woodral |
| 7,466,996 | B2 | 12/2008 | Carballo |
| 7,487,426 | B2 * | 2/2009 | Hoyer ........................ 714/752 |
| 7,558,874 | B1 | 7/2009 | Kodukula et al. |
| 7,603,574 | B1 | 10/2009 | Gyugyi et al. |
| 7,639,687 | B1 * | 12/2009 | Tsai et al. ..................... 370/392 |
| 7,664,134 | B2 | 2/2010 | Caldwell et al. |
| 7,720,068 | B2 | 5/2010 | McClellan |
| 7,924,187 | B2 | 4/2011 | Diab |
| 8,185,761 | B2 * | 5/2012 | Diab et al. ..................... 713/322 |
| 2003/0074464 | A1 | 4/2003 | Bohrer et al. |
| 2003/0191854 | A1 | 10/2003 | Hsu et al. |
| 2003/0221026 | A1 | 11/2003 | Newman |

(Continued)

OTHER PUBLICATIONS

Diab and Powell, Subset PHY: Cost and Power Analysis, Seoul, South Korea, Sep. 2007.*

(Continued)

*Primary Examiner* — Vincent Tran
(74) *Attorney, Agent, or Firm* — Duane S. Kobayashi

(57) ABSTRACT

A system and method for reducing power consumption during periods of low link utilization. A single enhanced core can be defined that enables operation of subset of parent physical layer devices (PHYs). The subset and parent PHYs can have a fundamental relationship that enables synchronous switching between them depending on the link utilization state.

20 Claims, 6 Drawing Sheets

U.S. PATENT DOCUMENTS

| | | |
|---|---|---|
| 2004/0202198 A1 | 10/2004 | Walker et al. |
| 2005/0063413 A1 | 3/2005 | Caldwell et al. |
| 2006/0256875 A1 | 11/2006 | McClellan |
| 2006/0285494 A1 | 12/2006 | Li et al. |
| 2008/0049788 A1 | 2/2008 | McClellan |
| 2008/0107136 A1 | 5/2008 | Joo et al. |
| 2009/0154492 A1 | 6/2009 | Diab et al. |
| 2009/0204736 A1 | 8/2009 | Xie et al. |
| 2010/0177785 A1 | 7/2010 | Kisaka et al. |

OTHER PUBLICATIONS

IEEE 802.3ae-2002, Section 48, Physical Coding Sublayer (PCS) and Physical Medium Attachment (PMA) sublayer, type 10GBASE-X, 2002.

George Zimmerman, "Considerations for Technical Feasibility of EEE with 10GBASE-T," Mar. 7, 2007.

Ilango Ganga, Intel, "Considerations for 40G backplane Ethernet Phy," Sep. 2007.

Scott Powell, Wael Diab, Broadcom, "A Gigabit 'Subset Phy' Approach for 10GBASE-T Energy Efficient Ethernet," Atlanta, GA, Nov. 2007.

Mike Bennett, "Energy Efficient Ethernet and 802.1," IEEE 802 Plenary, Atlanta, GA, Nov. 16, 2007.

Mike Bennett et al., "Improving the Energy Efficiency of Ethernet: Adaptive Link Rate Proposal," Version 1.0, Jul. 15, 2006.

\* cited by examiner

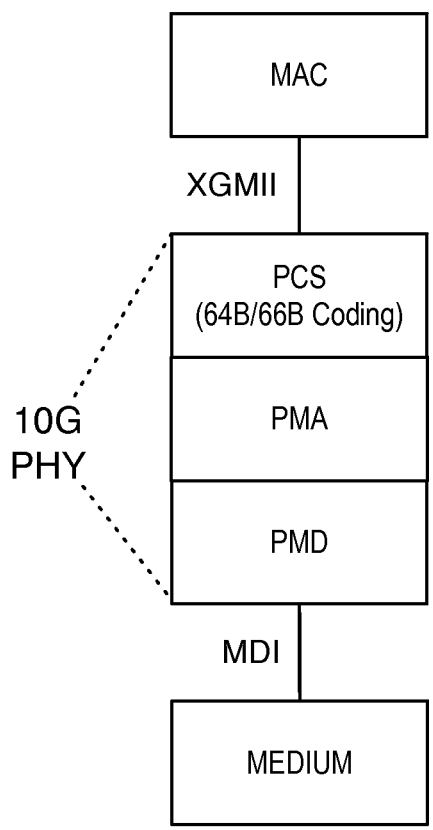 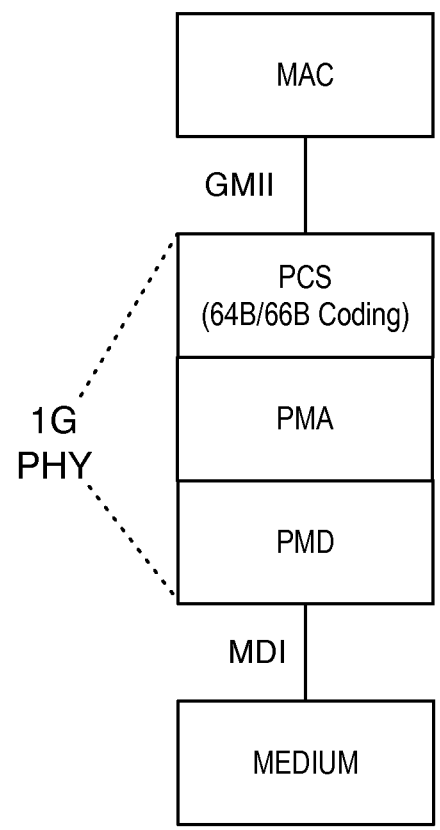
FIG. 2A                    FIG. 2B

SYSTEM AND METHOD FOR REDUCING POWER CONSUMPTION DURING PERIODS OF LOW LINK UTILIZATION

This application is a continuation of non-provisional patent application Ser. No. 12/165,584, filed Jun. 30, 2008, which claims priority to provisional application No. 61/022,439, filed Jan. 21, 2008. Each of the above-identified patent application is incorporated by reference herein, in its entirety, for all purposes.

BACKGROUND

1. Field of the Invention

The present invention relates generally to Ethernet systems and, more particularly, to a system and method for reducing power consumption during periods of low link utilization.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

One area that has shown the potential for cost and energy savings is efficient link utilization. Most network links are typically in an idle state between sporadic bursts of data. The overall link utilization is therefore relatively low. Reducing link rates when the high data capacity is not needed can therefore save energy. In other words, a link can use a high data rate when data transmission needs are high, and use a low data rate when data transmission needs are low. While this concept of efficient link utilization is well known, what is needed is an efficient mechanism for adapting the link rate to provide reduced power consumption during a period of low link utilization.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 2A and 2B illustrate an example of parent and subset PHYs.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts. One of those applications is backplane technology for equipment such as blade servers and other chassis-based equipment. Here, traffic is transmitted in standard-sized or jumbo Ethernet frames on a backplane, which interconnects various modules and interface components.

Figure 1:
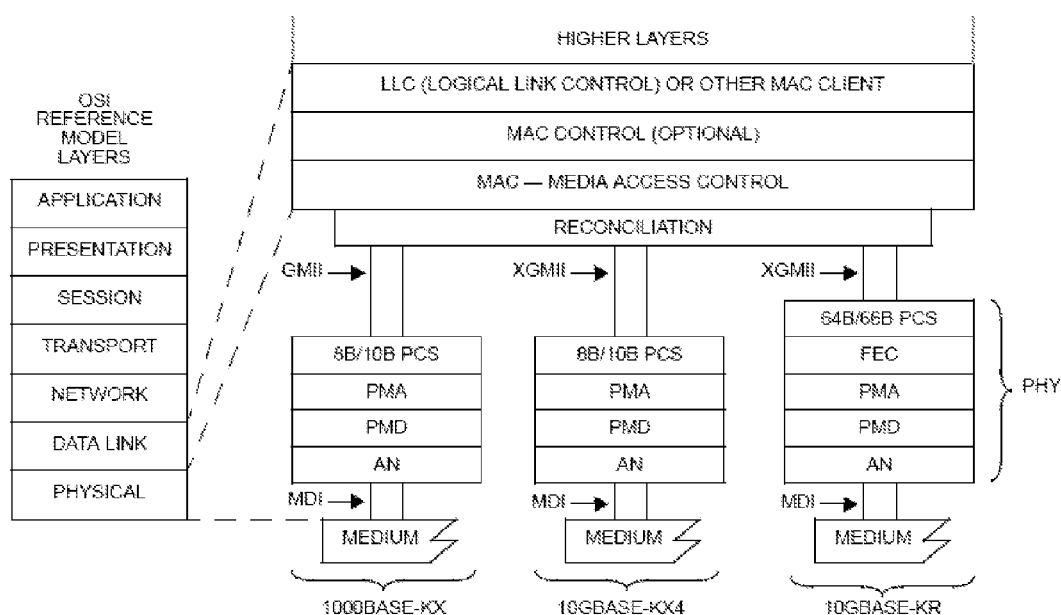
FIG. 1 illustrates an example of Ethernet physical layer devices (PHYs).

The IEEE 802.3ap specification provides for 10 Gbit/s operation over a distance of up to 40 inches on a backplane. In general, backplane Ethernet couples the IEEE 802.3 (CSMA/CD) MAC to a family of Physical Layers defined for operation over electrical backplanes. FIG. 1 illustrates the relationships among Backplane Ethernet, the IEEE 802.3 MAC, and the ISO Open System Interconnection (OSI) reference model. As illustrated, three different physical layer devices (PHYs) are specified: 1000 BASE-KX specifies 1 Gbit/s serial operation, 10 GBASE-KX4 specifies 10 Gbit/s 4-lane operation, and 10 GBASE-KR specifies 10 Gbit/s serial operation.

As illustrated, the 1000 BASE-KX core includes a physical coding sublayer (PCS), a physical medium attachment (PMA), physical media dependent (PMD), and auto-negotiation (AN). The PCS is generally responsible for encoding/decoding gigabit media independent interface (GMII) octets to/from ten-bit code-groups (8 B/10 B) for communication with the underlying PMA. In contrast, the PCS in the 10 GBASE-KR core is generally responsible for encoding/decoding 10 gigabit media independent interface (XGMII) 64-bit data to/from 66-bit code-groups (64 B/66 B) for communication with the underlying PMA.

In general, the PMA abstracts the PCS from the physical medium. Accordingly, the PCS can be unaware of the type of medium. The primary functions of the PMA include mapping of transmit and receive code-groups between the PCS and PMA, serialization/de-serialization of code-groups for transmission/reception on the underlying serial PMD, recovery of clock from the coded data (e.g., 8 B/10 B, 64 B/66 B, etc.) supplied by the PMD, and mapping of transmit and receive bits between the PMA and PMD.

The PMD is generally responsible for generating electrical or optical signals depending on the nature of the physical medium connected. PMD signals are sent to the medium dependent interface (MDI), which is the actual medium connected, including connectors, for the various media supported.

As noted above, the PMA is responsible for the recovery of the received clock, which is used by the PCS to sample the data presented to it by the PMA. Conventional clock recovery mechanisms use delay locked loops (DLLs) or phase locked loops (PLLs) that align a local clock's phase to the phase of the recovered clock.

As noted, one of the ways of creating an energy efficient network is through efficient link utilization. In general, the lack of data transmission does not significantly reduce energy consumption of a PHY in most implementations. A 10 Gbit/s link, for example, will consume about the same amount of power whether a burst of data is transmitted during a file transfer, a constant stream of data is transmitted at lower bandwidth, or no data is transmitted during an idle period. If a 10 Gbit/s link can be slowed down to a lower link rate (e.g., 1 Gbit/s) link during idle times, then power can be saved in the operation of the PHY. Moreover, if the PHY is clocked at a lower rate, then the higher layer elements (e.g., MAC layer)

that interface with the PHY could also potentially be clocked at a lower rate. If multiple ports slow down, then shared resources (e.g., switch, memory interfaces, etc.) could also be slowed down as well. In the aggregate, significant power savings can be achieved through the operation of the link at lower rates.

In one example, a lower link rate can represent any fraction of the highest link rate. Depending on the implementation, one or more lower link rates (e.g., 10 Mbit/s, 100 Mbit/s, 500 Mbit/s, 1 Gbit/s) can be defined to accommodate one or more lower utilization levels. As would be appreciated, a zero rate can also be defined.

One of the key considerations in efficient link utilization is the speed at which the transitions between link rates can occur. This is especially true in the transition from a reduced link rate to the maximum supported link rate, as unscheduled bursts of data arrive for transport. In one implementation, the link status as reported to the higher layers remains unchanged even if the link rate is reduced. Accordingly, the higher layers would continue to presume that the PHY is operating at full capacity. In this context, the transition time (e.g., millisecond v. microsecond levels) between link rates can therefore have a large memory impact when considering the amount of buffering that would be needed to facilitate large bursts of incoming data.

In the example 802.3ap implementation, transitions between a 10 Gbit/s link and a 1 Gbit/s link can be effected by transitioning between a 10 GBASE-KR link and a 1000 BASE-KX link. In this process, the PHY would, in effect, be transitioning between two distinct state machines that implement the 10 GBASE-KR and 1000 BASE-KX cores. As part of this process, the state of a first core would need to be saved prior to the switch, whereupon new transceiver coefficients would be acquired upon training and initialization of the second core. This process of saving state and reacquiring new operating coefficients can lead to unacceptably long link transition times (e.g., milliseconds). There is also the possibility that the stored state may "drift" over time causing either (a) longer time for convergence to occur, or (b) re-training since the coefficients would be stale. Here, it should be noted that where the link transitions to a zero rate, a continuous signal that contains energy and phase information but is low in power can be sent to eliminate the issue of drifting.

In accordance with the present invention, faster transition times between two link rates (e.g., 100 Gbit/s to 10 Gbit/s, 40 Gbit/s to 5 Gbit/s, 10 Gbit/s to 2.5 Gbit/s, 10 Gbit/s to 0 Gbit/s, 5 Gbit/s to 100 Mbit/s, etc.) is enabled through the creation of a lower-rate PHY that is a subset of a higher-rate PHY. In one embodiment, the line code for the lower data rate is a simple subset of the higher data rate. This enables the subset PHY to be implemented by simply turning off elements of the higher data rate standard parent PHY.

Consider for example the 10 GBASE-KR PHY. FIG. 2A illustrates a simplified diagram of the 10 GBASE-KR core. As illustrated, the PCS of the 10 G PHY is responsible for encoding/decoding XGMII 64-bit data to/from 66-bit codegroups (64 B/66 B) for communication with the underlying PMA. This 64 B/66 B line code is used to achieve DC-balance and operates with considerably less overhead (10.3125 Gbaud) as compared to the 8 B/10 B line coding (1.25 Gbaud) used by the 1000 BASE-KX core. Due to the difference in coding schemes the 10 GBASE-KR and 1000 BASE-KX cores do not have a fundamental frequency relationship between them.

In accordance with the present invention, a subset PHY is produced that is fundamentally related to a parent PHY. This fundamental relationship (e.g., divide by 10) enables the subset and parent PHYs to have a synchronous relation in retaining the relative bit boundaries.

In one embodiment, the parent PHY is an enhanced core (e.g., 10 GBASE-KR) that can be slowed down and sped up by whatever frequency multiple. For example, the enhanced core can be slowed down by a factor of 10 during low link utilization, then sped up by a factor of 10 when a burst of data is received. In the example of a factor of 10, a 10 G enhanced core can be transitioned down to a 1 G link rate when idle, and sped back up to a 10 G link rate when data is to be transmitted.

In one embodiment, the enhanced core includes control logic that would enable a timing element (e.g., DLL or PLL) that drives the enhanced core to be divided/multiplied in frequency when a link utilization state transition is detected. A transition from a high utilization state to a low utilization state would cause the control logic to divide the frequency of the timing element, while a transition from a low utilization state to a high utilization state would cause the control logic to multiply the frequency of the timing element.

The subset PHY can therefore be viewed as a down-clocked version of the parent PHY, with certain elements of the parent PHY being turned off (e.g., forward error correction, parallel circuits, etc.) or turned down (e.g., analog biases) by the control logic. FIG. 2B illustrates a simplified view of a subset PHY that is based on the 10 G parent PHY of FIG. 2A. As illustrated, the 1 G subset PHY has retained the 64 B/66 B coding by the PCS. Instead of operating at 10.3125 Gbaud, however, the 1 G subset PHY operates at 1.03125 Gbaud, or one tenth of the rate of the parent 10 G PHY. The implementation of a down-clocked 64 B/66 B coding in the 1 G subset PHY is in contrast to conventional 1 G PHYs that operate with 8 B/10 B coding.

Figure 3:
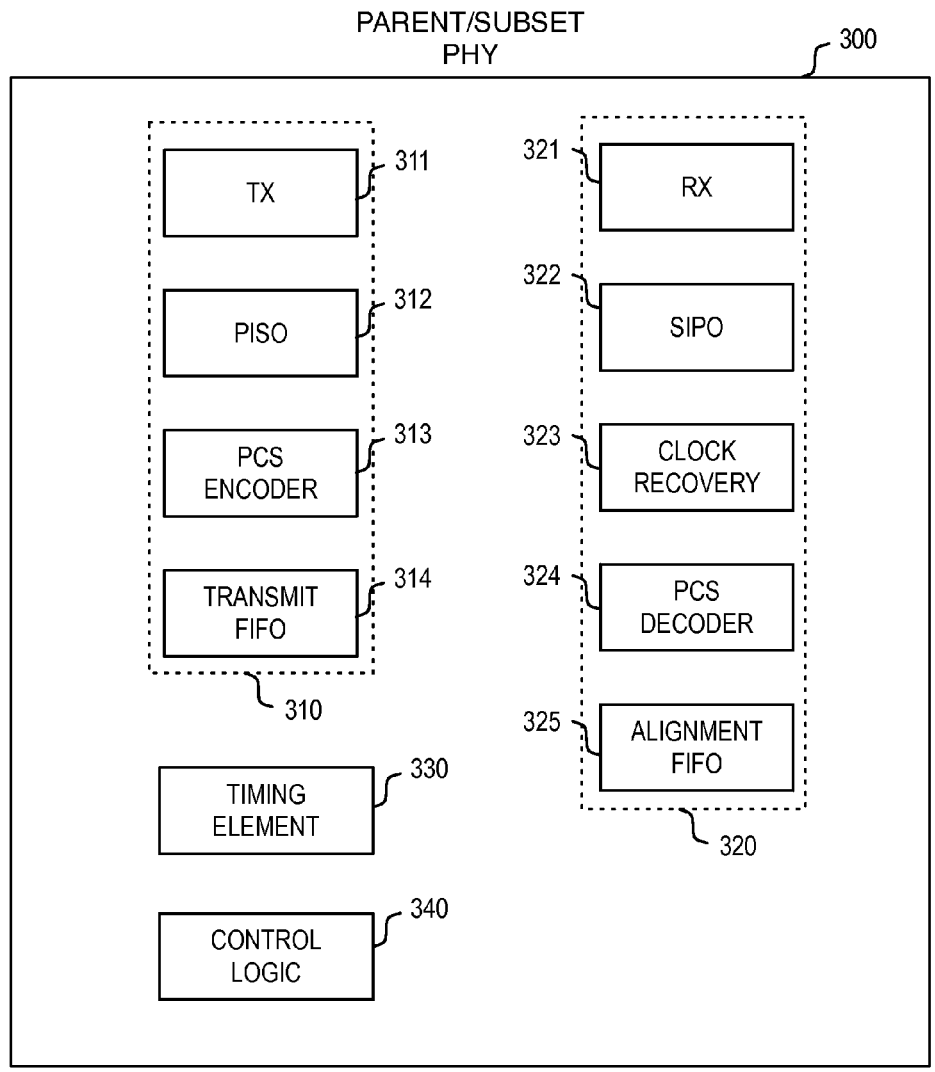
FIG. 3 illustrates an embodiment of a parent/subset PHY.

FIG. 3 illustrates an embodiment of enhanced core that can function as a parent/subset PHY. As illustrated, PHY 300 includes transmitter section 310 and receiver section 320. Transmitter section 310 includes transmitter (TX) 311, parallel-in-serial-out (PISO) block 312, encoder 313, and transmit FIFO 314. In general, PISO 312 takes the TX code group output from PCS encoder 313 and generates a serial output for the PMD. For both the parent and subset PHY, a common encoder (e.g., 64 B/66 B) is used. The operation of PISO 312 is based on a clock signal generated by clock multiplier unit (CMU), which multiplies the incoming parallel PMA TX clock. In one embodiment, PISO 312 has a single shift register that receives the parallel data once per parallel clock and shifts it out at the higher serial clock rate.

Receiver section 320 includes receiver (RX) 321, serial-in-parallel-out (SIPO) block 322, clock recovery 323, PCS decoder 324, and alignment FIFO 325. In general, SIPO 322 takes the serial input from the PMD and generates the RX code group for the PMA. The RX code group is processed by PCS decoder 324 in accordance with an embedded clock in the received signal. This recovered clock signal is generated by a clock recovery unit (CRU), which divides the incoming clock down to the parallel rate for output to the PCS.

As FIG. 3 further illustrates, parent/subset PHY 300 also includes timing element 330. In accordance with the present invention, timing element 330 is controlled by control logic 340. Here, control logic 340 can be designed to divide/multiply an output of timing element 330 to thereby slow down or speed up the operation of parent/subset PGY 300. In this manner, the enhanced core can be adjusted in speed to address detected states of high/low link utilization. For example, a transition from a high link utilization state to a low link utilization state would cause control logic 340 to reduce the frequency of timing element 330, while a transition from a low utilization state to a high utilization state would cause control logic 340 to multiply the frequency of timing element 330.

In one embodiment, timing element 330 is based on a DLL or a PLL, which can be used by components in transmitter section 310 and receiver section 320. As would be appreciated, timing element 330 can be implemented as a common functional block for PHY 300 or as a transmitter/receiver specific component.

With the use of subset PHYs, link rates can be synchronously changed up or down. In this process, the encoder/decoder (e.g., 64 B/66 B) would get a continuous clock so that it does not lose synchronization. The complexity of switching between different cores is thereby eliminated, leading to faster switching times on the order of tens of microseconds. In general, no changes to the wire signaling would be needed due to the simple and limited control overhead.

Figure 4:
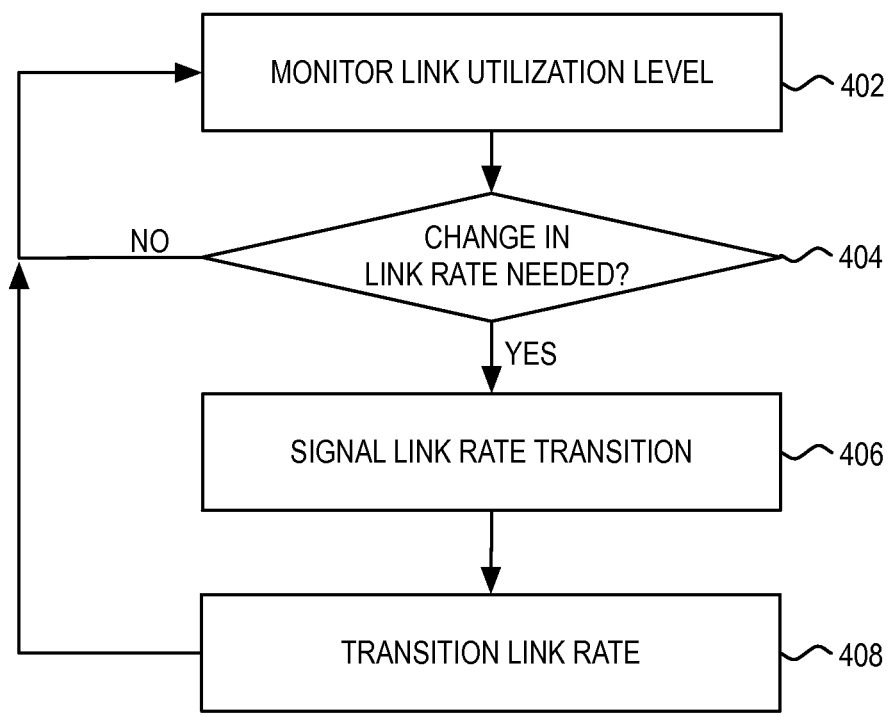
FIG. 4 illustrates a flowchart of a process of the present invention

To further illustrate the principles of the present invention, reference is now made to the flowchart of FIG. 4. As illustrated, the process begins at step 402 where a link utilization level is monitored. This link utilization level can enable the system to determine whether or not the current link rate is properly matched with the amount of traffic to be transmitted. For example, if the link is idle, then a transition to a lower link rate can be considered. Alternatively, if the link is at or near capacity, then a transition to a higher link rate can be considered. At step 404, it is therefore determined whether a change in link rate is needed.

If it is determined that a change in link rate is not needed, then the process continues back to step 402 where the link utilization levels continue to be monitored. If, on the other hand, it is determined that a change in link rate is needed, then the process continues to step 406 where a link rate transition is signaled to the receiving system. As would be appreciated, a switch in link rates would require coordination on both ends of the link. This coordination between both ends of the link can be facilitated in various ways (e.g., in band, out of band, etc.). In one embodiment, a request/acknowledge communication cycle is used. To facilitate a quicker transition, a physical layer control mechanism can be used. As would be appreciated, the principles of the present invention are not dependent on the particular communication mechanism that is implemented. After the link rate transition is signaled at step 406, the transition in the link rate can then occur at step 408. The process would then continue to step 402 where the link utilization level would be monitored for further link rate transitions. These various link rate transitions can be used to accommodate two or more defined link utilization levels.

Figure 5:
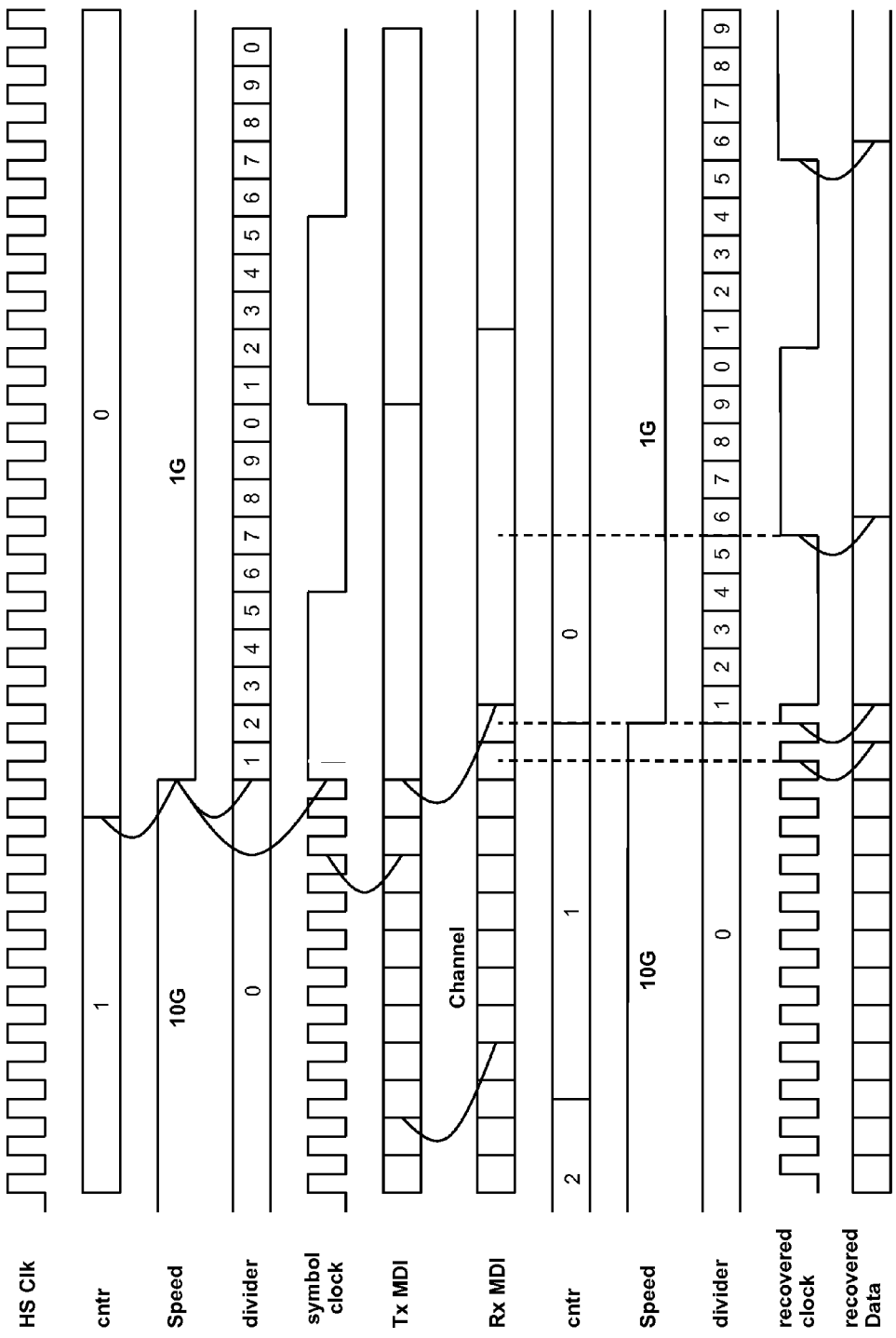
FIGS. 5 and 6 illustrate an example of synchronously shifting between subset and parent PHYs.
Figure 6:
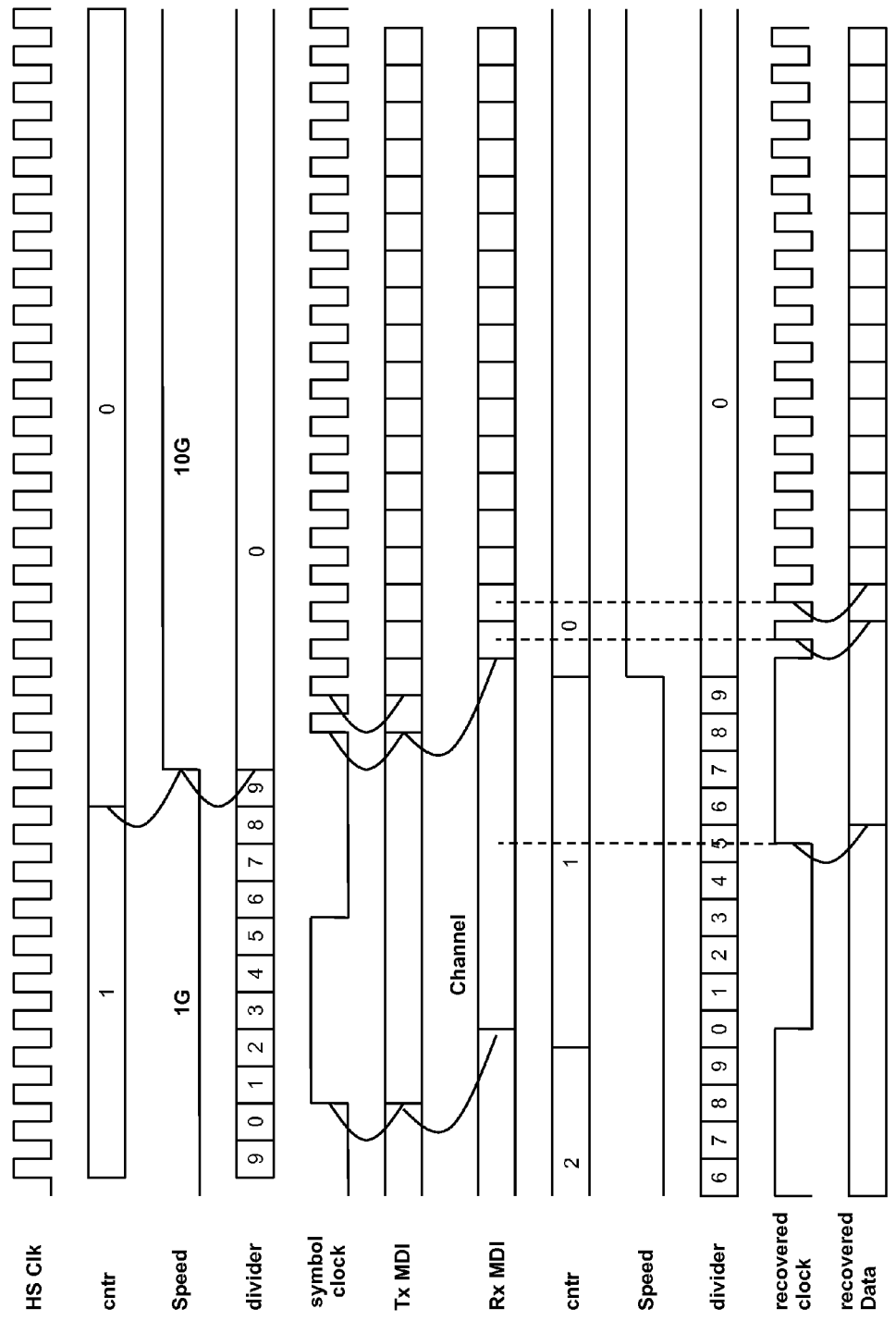

FIGS. 5 and 6 illustrate an example of shifting between subset and parent PHYs that have a fundamental relationship. Significantly, the synchronous relation between the subset and parent PHYs enable seamless transitions between the subset and parent PHYs on the fly.

As would be appreciated, the principles of the present invention can be applied to any combination of link rates. For example, higher future rates such as 100 G and 40 G, as well as non-standard rates such as 5 G, 2.5 G or lower than 1 G can be used. It should also be noted, that the synchronous switching between rates can occur within the data stream, and would not be limited to packet boundaries. Still further, it should be noted that the fundamental relationship between the parent and subset PHYs can be defined based on implementation specific considerations. In one example, a lower fundamental relationship can be used to create an additional out of bandwidth channel for control purposes.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An Ethernet physical layer device, comprising:
   a physical layer device core designed to operate in a first operating mode that enables transmission at a first transmission rate, said physical layer device core having an xB/yB encoder that converts x bits of data into y bits of line code for transmission while in said first operating mode; and
   a control logic that switches a frequency of operation of said physical layer device core through application of a multiplier or divider to a timing element that produces a clock signal that enables said physical layer device core to operate in a second operating mode that enables transmission at a second transmission rate upon detection of a low link utilization condition, said second transmission rate being different from said first transmission rate, wherein operation of said physical layer device core in said second operating mode uses said xB/yB encoder.

2. The Ethernet physical layer device of claim 1, wherein said control logic controls a frequency divider/multiplier.

3. The Ethernet physical layer device of claim 2, wherein said frequency divider/multiplier switches said frequency of operation of said enhanced physical layer device by a factor of 10.

4. The Ethernet physical layer device of claim 1, wherein said xB/yB encoder is a 64 B/66 B encoder.

5. The Ethernet physical layer device of claim 1, wherein said enhanced physical layer device core implements 10 GBASE-KR.

6. The Ethernet physical layer device of claim 1, wherein said control logic initiates signaling of a transition to said second operating mode where said enhanced physical layer device maintains synchronization with a second physical layer device during said transition.

7. The Ethernet physical layer device of claim 1, wherein said control logic determines which of a plurality of lower frequencies corresponding to a respective plurality of lower utilization levels to switch to.

8. A method, comprising:
   operating a physical layer device core in a first operating mode during a period of link utilization at a first level, said first operating mode enabling transmission at a first transmission rate, wherein said physical layer device core has an xB/yB encoder/decoder that converts x bits of data into y bits of line code for transmission while in said first operating mode;
   signaling, to a receiving device, a transition of said physical layer device core to a second operating mode when a link utilization at a second level different from said first level is identified, said second operating mode enabling transmission at a second transmission rate different from said first transmission rate; and
   transitioning said physical layer device core to said second operating mode, said second operating mode using said xB/yB encoder/decoder during said second operating mode, wherein said transition is based on an application of a multiplier or divider to a timing element that produces a clock signal used by said physical layer device core.

9. The method of claim 8, wherein said multiplier or divider is ten.

10. The method of claim 9, wherein said first operating mode is a 10 gigabit mode and said second operating mode is a 1 gigabit mode.

11. The method of claim 9, wherein said first operating mode is a 1 gigabit mode and said second operating mode is a 10 gigabit mode.

12. The method of claim 11, wherein said 10 gigabit mode is facilitated using 10 GBASE-KR.

13. The method of claim 8, wherein said signaling comprises signaling a transition in which said physical layer device core maintains synchronization with a second physical layer device in during said transition.

14. The method of claim 8, wherein said signaling comprises signaling a transition in which said physical layer device core continues to transmit a data stream during said transition.

15. An Ethernet physical layer device, comprising:
an physical layer device core designed having an xB/yB encoder/decoder that converts x bits of data into y bits of line code for transmission; and
a control logic that switches a frequency of operation of said physical layer device core to a second frequency lower than a first frequency, through application of a multiplier or divider to a timing element that produces a clock signal used by said physical layer device, upon detection of a low link utilization condition, wherein said xB/yB encoder/decoder is used during operation at both said first frequency and said second frequency.

16. The physical layer device of claim 15, wherein said first frequency and said second frequency are different by a factor of 10.

17. The physical layer device of claim 15, wherein said xB/yB encoder/decoder is a 64 B/66 B encoder/decoder.

18. The physical layer device of claim 15, wherein said control logic controls a frequency divider/multiplier.

19. The physical layer device of claim 15, wherein said physical layer device core implements 10 GBASE-KR.

20. The physical layer device of claim 15, wherein said control logic determines which of a plurality of lower frequencies corresponding to a respective plurality of lower utilization levels to switch to.

* * * * *